US012601615B2

(12) United States Patent (10) Patent No.: US 12,601,615 B2
Furumai et al. (45) Date of Patent: Apr. 14, 2026

(54) LIGHT RECEIVING ELEMENT, AND ROTATION DETECTOR

(71) Applicant: Panasonic Intellectual Property Management Co., Ltd., Osaka (JP)

(72) Inventors: Kenji Furumai, Osaka (JP); Akio Agehara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 261 days.

(21) Appl. No.: 18/568,812

(22) PCT Filed: May 17, 2022

(86) PCT No.: PCT/JP2022/020502
§ 371 (c)(1),
(2) Date: Dec. 9, 2023

(87) PCT Pub. No.: WO2022/264735
PCT Pub. Date: Dec. 22, 2022

(65) Prior Publication Data
US 2024/0271968 A1      Aug. 15, 2024

(30) Foreign Application Priority Data

Jun. 18, 2021     (JP) ................................. 2021-101640

(51) Int. Cl.
*G01D 5/347*          (2006.01)
(52) U.S. Cl.
CPC ....... *G01D 5/3473* (2013.01); *G01D 2205/26* (2021.05)
(58) Field of Classification Search
CPC ............. G01D 5/3473; G01D 2205/26; G01D 2205/20; G01D 5/264; G01D 5/34715
See application file for complete search history.

(56) References Cited

U.S. PATENT DOCUMENTS

| | | | |
|---|---|---|---|
| 2002/0014581 A1 | 2/2002 | Yamamoto et al. | |
| 2007/0138382 A1* | 6/2007 | Matsuyama ....... | G01D 5/34792 250/231.13 |

(Continued)

FOREIGN PATENT DOCUMENTS

| | | |
|---|---|---|
| JP | 2005-121593 | 5/2005 |
| JP | 4273442 B | 6/2009 |

(Continued)

OTHER PUBLICATIONS

International Search Report of PCT application No. PCT/JP2022/020502 dated Aug. 2, 2022.

(Continued)

*Primary Examiner* — Jia X Pan
(74) *Attorney, Agent, or Firm* — Rimon P.C.

(57)          ABSTRACT

Provided are a light receiving element and a rotation detector capable of enhancing a degree of freedom in designing an increment light receiver. Light receiving element includes a plurality of first absolute light receivers that are arranged on a first circumference having a first radius and output detection signals according to the absolute method, and a plurality of light receiver groups that output detection signals according to the increment method. The plurality of light receiver groups are selectively arranged in the region having the radius greater than the first circumference with respect to the plurality of first absolute light receivers, and are arranged on the second circumference concentric with the first circumference and having the second radius greater than the first radius, and the plurality of first absolute light receivers and the plurality of light receiver groups do not overlap each other.

7 Claims, 6 Drawing Sheets

(56)         References Cited

U.S. PATENT DOCUMENTS

| 2015/0122982 | A1* | 5/2015 | Yoshida | G01D 5/3473 |
| | | | | 250/231.13 |
| 2016/0161295 | A1* | 6/2016 | Uemura | G01D 5/34715 |
| | | | | 250/231.14 |
| 2018/0299300 | A1 | 10/2018 | Kimura et al. | |
| 2019/0376817 | A1* | 12/2019 | Fukuda | G01D 5/34784 |
| 2021/0018890 | A1* | 1/2021 | Takada | G01D 5/34715 |
| 2024/0271968 | A1 | 8/2024 | Furumai et al. | |

FOREIGN PATENT DOCUMENTS

| JP | 2015-090300 | 5/2015 |
| JP | 2015-090303 | 5/2015 |
| JP | 5927482 B2 | 6/2016 |

OTHER PUBLICATIONS

International Search Report of PCT Application PCT/JP2022/020501 dated Jul. 12, 2022.
Non-Final Office Action dated Dec. 23, 2025 issued in related U.S. Appl. No. 18/567,007.

\* cited by examiner

LIGHT RECEIVING ELEMENT, AND ROTATION DETECTOR

TECHNICAL FIELD

The present disclosure relates to a light receiving element and a rotation detector.

BACKGROUND ART

Conventionally, a configuration using an optical means including a light emitter, a light receiving element, and the like in a rotation detector has been known. For example, a rotation detector described in PTL 1 uses a light receiving element including an absolute detector and an increment detector disposed on a circumference around a rotary shaft.

In the rotation detector described in PTL 1, two increment detectors are disposed in the light receiving element, and an absolute detector is disposed between the two increment detectors. That is, the increment detector is disposed on each of two circumferences having different radii around the rotary shaft, and the absolute detector is disposed on a circumference disposed between the two circumferences. As a result, it is intended to suppress deterioration in characteristics of the rotation detector due to positional deviation of the light receiving element and the like.

CITATION LIST

Patent Literature

PTL 1: Japanese Patent No. 4273442

SUMMARY OF THE INVENTION

Here, in order to detect a more accurate rotational position by the detection signal of the increment detector, it is necessary to output a signal with small distortion (that is, close to a sine wave) from the increment detector. Therefore, it is important to design the shape of each of the plurality of increment light receivers included in the increment detector. In order to enhance the degree of freedom in designing the increment light receiver, it is preferable that the dimension in the circumferential direction in which the increment detector is arranged is larger. However, in the rotation detector described in PTL 1, one increment detector is disposed on the inner diameter side (that is, the rotary shaft side) with respect to the absolute detector. Therefore, the degree of freedom in designing the increment light receiver included in the increment detector on the inner diameter side is low.

The present disclosure has been made to solve such a problem, and an object of the present disclosure is to provide a light receiving element capable of enhancing a degree of freedom in designing an increment light receiver, and a rotation detector including the light receiving element.

In order to achieve the above object, one aspect of a light receiving element according to the present disclosure includes: a plurality of first absolute light receivers that are arranged on a first circumference having a first radius and output a detection signal according to the absolute method; and a plurality of light receiver groups that output a detection signal according to the increment method. The plurality of light receiver groups are selectively arranged in a region having a radius greater than the first circumference, and are arranged on a second circumference concentric with the first circumference and having a second radius greater than the first radius, and the plurality of first absolute light receivers do not overlap with the plurality of light receiver groups.

One aspect of a rotation detector according to the present disclosure includes: the light receiving element; and a rotating plate that is irradiated with the light and rotates about a rotary shaft, in which the light is emitted to the light receiving element via the rotating plate.

According to the present disclosure, it is possible to realize a light receiving element and a rotation detector capable of enhancing a degree of freedom in designing an increment light receiver.

DESCRIPTION OF EMBODIMENT

Exemplary embodiments of the present disclosure will be described below with reference to the drawings. Note that the exemplary embodiments described below each illustrate one specific example of the present disclosure. Thus, the numerical values, shapes, materials, components, arrangement positions and connection forms of the components, and the like shown in the following exemplary embodiment are examples, and are not intended to limit the present disclosure. Thus, among the constituent elements in the following exemplary embodiments, constituent elements that are not described in independent claims indicating the highest concept of the present disclosure are described as optional constituent elements.

Note that each of the drawings is a schematic diagram and not necessarily illustrated exactly. In addition, in each drawing, substantially identical components are denoted by identical reference signs and repetitive explanations thereof will be omitted or simplified.

Exemplary Embodiment

A light receiving element and a rotation detector according to an exemplary embodiment will be described.

[1-1. Overall Configuration]

First, an overall configuration of a light receiving element and a rotation detector according to the present exemplary embodiment will be described with reference to FIG. 1.

Figure 1:
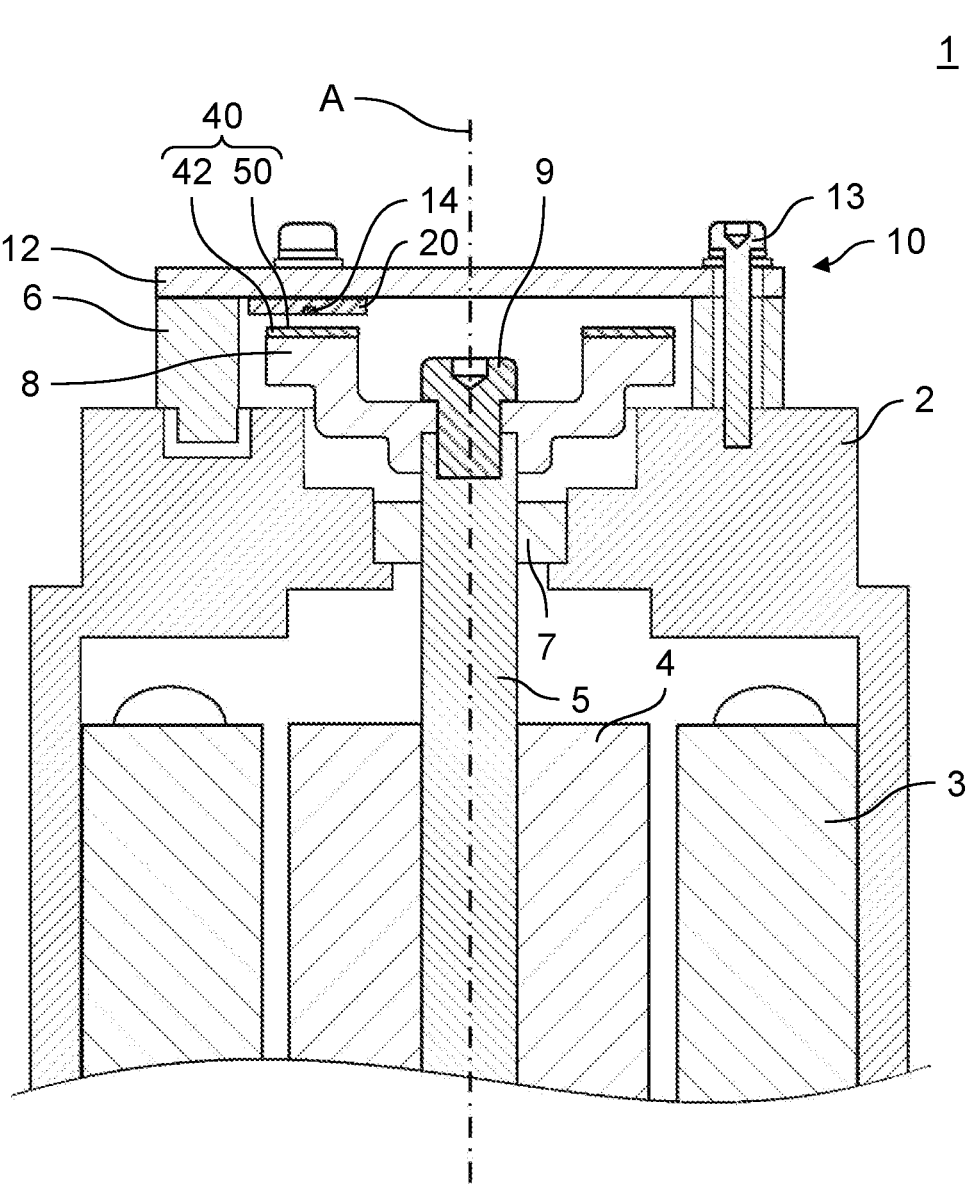
FIG. 1 is a cross-sectional view illustrating a configuration of an electric motor including a rotation detector according to an exemplary embodiment.

FIG. 1 is a cross-sectional view illustrating a configuration of electric motor 1 including rotation detector 10 according to the present exemplary embodiment. FIG. 1 illustrates a cross section passing through rotation axis line A of electric motor 1.

As illustrated in FIG. 1, electric motor 1 mainly includes motor frame 2, stator 3, rotor 4, rotary shaft 5, bearing 7, and rotation detector 10.

Motor frame 2 is a housing that houses stator 3, rotor 4, and the like. Stator 3 is fixed to the inner surface of motor frame 2. Rotor 4 is provided on motor frame 2 via bearing 7 so as to be rotatable with respect to stator 3.

Rotary shaft 5 is a rod-like member, is fixed to the inner surface of rotor 4, and rotates around rotation axis line A. Rotary shaft 5 is rotatably fixed to motor frame 2 via bearing 7. For example, when electric power is supplied to electric motor 1, rotary shaft 5 rotates about rotation axis line A together with the rotor 4 based on the electric power. Rotation detector 10 is provided at one axial end of rotary shaft 5. A load rotationally driven by the rotation of rotary shaft 5, such as a blade, a gear, or a wheel, for example, is attached to the other axial end of rotary shaft 5. For example, rotary shaft 5 is formed of a magnetic metal such as iron.

Bearing 7 is a member that is fixed to motor frame 2 and rotatably supports rotary shaft 5 with respect to motor frame 2. In FIG. 1, bearing 7 is disposed near one end of rotary shaft 5, but a bearing may also be disposed near the other end of rotary shaft 5.

Rotation detector 10 detects rotation of the detection target. Specifically, rotation detector 10 detects a position (rotational position) of the detection target, a rotation direction of the detection target, a rotation speed of the detection target, and the like. In the present exemplary embodiment, the detection target is rotary shaft 5. That is, rotation detector 10 detects the position of rotary shaft 5, the rotation direction of rotary shaft 5, the rotation speed of rotary shaft 5, and the like.

As described above, rotation detector 10 is provided at one end of rotary shaft 5. Rotation detector 10 includes light receiving element 20, light emitter 14, and rotating plate 40. In the present exemplary embodiment, rotation detector 10 further includes substrate 12, frame 6, boss 8, bolt 9, and screw 13.

Frame 6 is a tubular member attached to motor frame 2 so as to cover one end portion of rotary shaft 5 in the axial direction, rotating plate 40, and the like. In the present exemplary embodiment, frame 6 is fixed to motor frame 2 together with substrate 12 by screws 13.

Rotating plate 40 is a plate that is fixed to rotary shaft 5 via boss 8 and rotates about rotation axis line A, and includes body 42 and pattern portion 50. Body 42 has a plate shape whose thickness direction is a direction along rotation axis line A. Body 42 has an annular shape when viewed from a direction along rotation axis line A. Body 42 is attached to one end portion of rotary shaft 5 in the axial direction, and rotates about rotation axis line A together with rotary shaft 5. The axis of body 42 coincides with rotation axis line A.

Pattern portion 50 is a light modulation portion disposed on a path (that is, an optical path) of light propagating from light emitter 14 to light receiving element 20. In the present exemplary embodiment, pattern portion 50 is disposed between the edge of body 42 and rotation axis line A at a position facing light emitter 14 and light receiving element 20. In pattern portion 50, a light modulation pattern is formed on a circumference centered on rotation axis line A. In the present exemplary embodiment, in pattern portion 50, a portion having a high reflectance and a portion having a low reflectance to light from light emitter 14 are formed in a predetermined pattern. Rotating plate 40 is made of, for example, stainless steel, and a film having a low reflectance is formed on the low reflectance portion of pattern portion 50. A detailed configuration of pattern portion 50 will be described later.

Boss 8 is a member to which rotating plate 40 is fixed. In the present exemplary embodiment, a through hole is formed at the center of boss 8. Boss 8 is fixed to rotary shaft 5 by bolt 9 inserted into the through hole, and rotates about rotation axis line A together with rotary shaft 5.

Bolt 9 is a member that fixes boss 8 to rotary shaft 5. In the present exemplary embodiment, bolt 9 is a hex socket bolt.

Substrate 12 is a plate-like member disposed at a position facing rotating plate 40 and spaced apart from rotating plate 40. Light receiving element 20 and light emitter 14 are disposed on a main surface of substrate 12 facing rotating plate 40. In the present exemplary embodiment, substrate 12 is fixed to motor frame 2 via frame 6 by screws 13.

Light emitter 14 is a light source that emits light. Light emitter 14 is disposed at a position facing pattern portion 50 of rotating plate 40. The configuration of light emitter 14 is not particularly limited as long as it can emit light. In the present exemplary embodiment, light emitter 14 is a light emitting diode and is disposed on substrate 12. More specifically, light emitter 14 is disposed on light receiving element 20 disposed on substrate 12. Light emitter 14 may be included in light receiving element 20. That is, light receiving element 20 may include light emitter 14.

Light receiving element 20 is an element that receives light from light emitter 14. Light from light emitter 14 is emitted to light receiving element 20 via rotating plate 40. In the present exemplary embodiment, light from light emitter 14 is reflected by pattern portion 50 of rotating plate 40, and is applied to light receiving element 20. A detailed configuration of light receiving element 20 will be described later.

[1-2. Configuration of Pattern Portion]

Figures 2, 3:
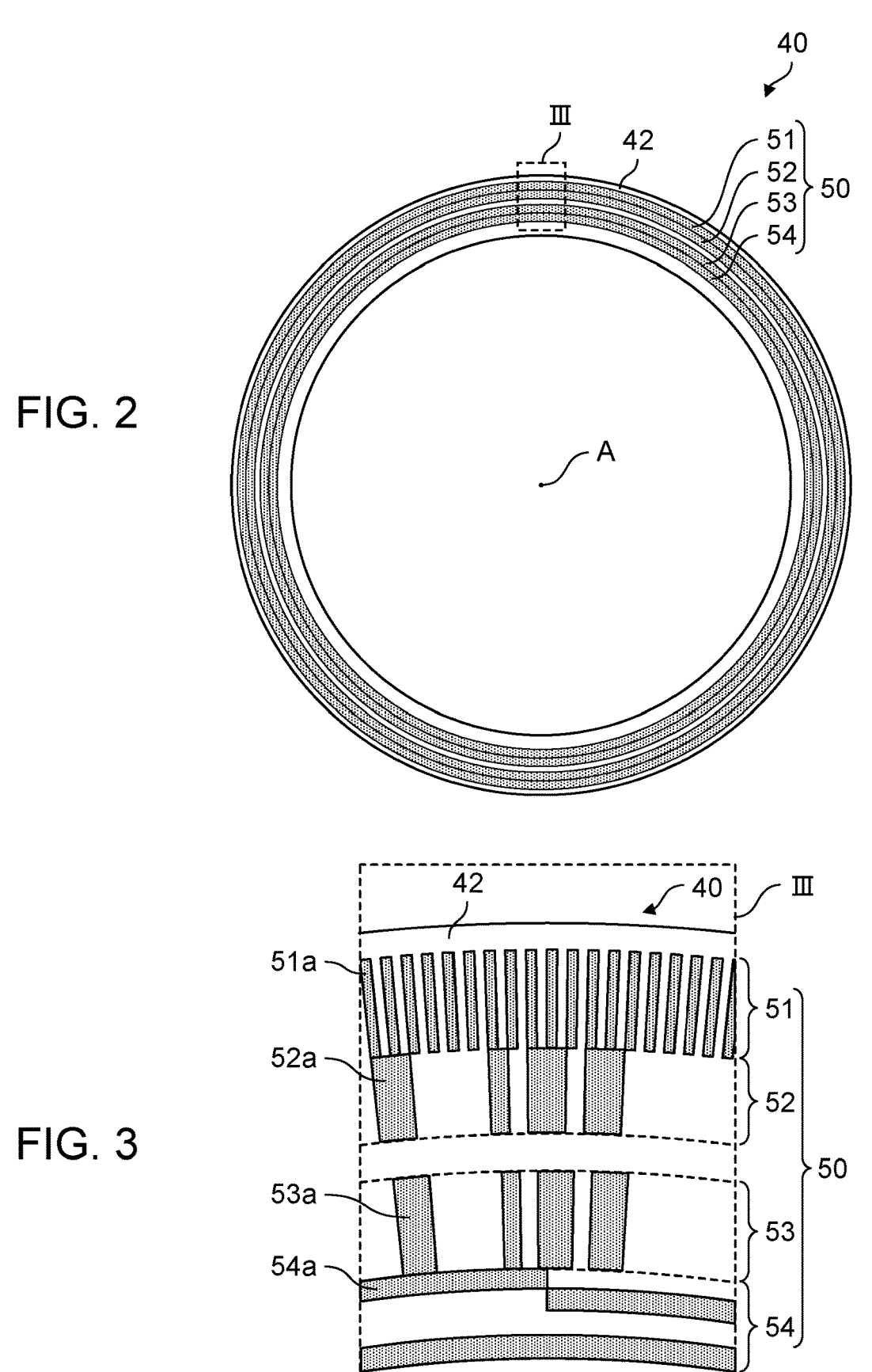
FIG. 2 is a plan view of a rotating plate included in the rotation detector according to the exemplary embodiment.
FIG. 3 is an enlarged view of a part of a pattern portion of a rotating plate included in the rotation detector according to the exemplary embodiment.

A detailed configuration of pattern portion 50 of rotating plate 40 included in rotation detector 10 according to the present exemplary embodiment will be described with reference to FIGS. 2 and 3. FIG. 2 is a plan view of rotating plate 40 included in rotation detector 10 according to the present exemplary embodiment. FIG. 2 is a plan view of a surface of rotating plate 40 facing light receiving element 20 as viewed from a direction along rotation axis line A. FIG. 3 is an enlarged view of a part of pattern portion 50 of rotating plate 40 included in rotation detector 10 according to the present exemplary embodiment. FIG. 3 is an enlarged view of the inside of broken-line frame III shown in FIG. 2.

As illustrated in FIGS. 2 and 3, pattern portion 50 is disposed on a surface of rotating plate 40 facing light receiving element 20. Pattern portion 50 is arranged on a circumference centered on rotation axis line A. In the present exemplary embodiment, pattern portion 50 includes first pattern portion 51, second pattern portion 52, third pattern portion 53, and fourth pattern portion 54. First pattern portion 51, second pattern portion 52, third pattern portion 53, and fourth pattern portion 54 are disposed in this order from an end edge side of rotating plate 40.

As illustrated in FIG. 3, first pattern portion 51 includes a plurality of low-reflection regions 51*a*. The plurality of low-reflection regions 51*a* are formed of, for example, a coating film having a low reflectance with respect to light from light emitter 14. The plurality of low-reflection regions 51*a* form an incremental pattern. The plurality of low-reflection regions 51*a* have the same rectangular (or fan-like) shape and are arranged at equal intervals on the circumference centered on rotation axis line A. The number of the plurality of low-reflection regions 51*a* is not particularly limited, but is 512 in the present exemplary embodiment.

Second pattern portion 52 includes a plurality of low-reflection regions 52*a*. The plurality of low-reflection regions 52*a* are formed of, for example, a coating film having a low reflectance with respect to light from light emitter 14. The plurality of low-reflection regions 52*a* form an absolute pattern. In the present exemplary embodiment, the plurality of low-reflection regions 52*a* are randomly arranged on a circumference around rotation axis line A on rotating plate 40. Light receiving element 20 can specify the absolute position in the circumferential direction around rotation axis line A of rotating plate 40 by receiving the light from light emitter 14 modulated by the plurality of low-reflection regions 52*a*.

Third pattern portion 53 includes a plurality of low-reflection regions 53*a*. The plurality of low-reflection regions 53*a* are formed of, for example, a coating film having a low reflectance with respect to light from light emitter 14. The plurality of low-reflection regions 53*a* form an absolute pattern. In the present exemplary embodiment, similarly to the plurality of low-reflection regions 53*a* of second pattern portion 52, the plurality of low-reflection regions 52*a* are randomly arranged on the circumference around rotation axis line A on rotating plate 40.

Fourth pattern portion 54 includes a plurality of low-reflection regions 54*a*. The plurality of low-reflection regions 54*a* are formed of, for example, a coating film having a low reflectance with respect to light from light emitter 14. Fourth pattern portion 54 is used to detect the rotation speed of rotating plate 40. In the present exemplary embodiment, the plurality of low-reflection regions 54*a* have an arcuate shape extending in the circumferential direction around rotation axis line A on rotating plate 40. Each of the plurality of low-reflection regions 54*a* has an arcuate shape with a central angle of 180 degrees. The number of the plurality of low-reflection regions 54*a* is not particularly limited, but in the present exemplary embodiment, there are four low-reflection regions 54*a* having arcuate shapes having different radii. The four low-reflection regions 54*a* are arranged at positions different from each other by 90 degrees about rotation axis line A.

[1-3. Configuration of Light Receiving Element]

Figure 4:
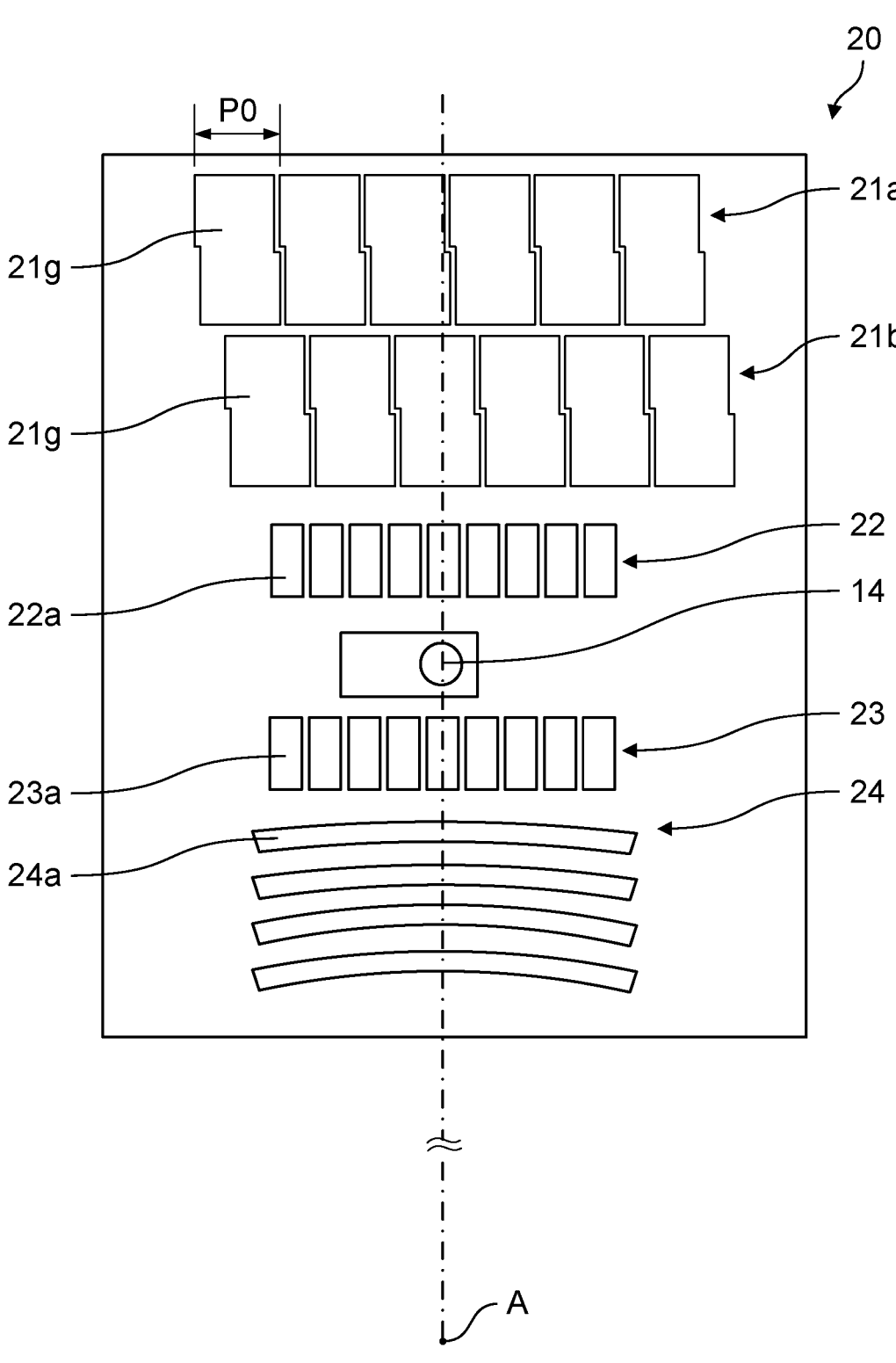
FIG. 4 is a plan view of the light receiving element according to the exemplary embodiment.

A configuration of light receiving element 20 will be described with reference to FIG. 4. FIG. 4 is a plan view of light receiving element 20 according to the present exemplary embodiment. FIG. 4 is a plan view of a surface of light receiving element 20 facing rotating plate 40 as viewed from a direction along rotation axis line A.

Light receiving element 20 is an element having a plurality of light receivers each of which is a region for detecting light. Light receiving element 20 is, for example, a plate-like element having a semiconductor layer. Each of the plurality of light receivers of light receiving element 20 is formed by, for example, adding an impurity to a semiconductor layer. Light receiving element 20 includes increment detectors 21*a* and 21*b* and first absolute detector 23. In the present exemplary embodiment, light receiving element 20 further includes second absolute detector 22 and rotation speed detector 24.

Increment detectors 21*a* and 21*b* are light detectors that output detection signals by the increment method. Increment detectors 21*a* and 21*b* are mainly irradiated with light from light emitter 14 via first pattern portion 51 of rotating plate 40. Each of increment detectors 21*a* and 21*b* includes a plurality of light receiver groups 21*g* arranged in a predetermined arrangement direction at predetermined arrangement pitch P0. In the present exemplary embodiment, the plurality of light receiver groups 21*g* included in increment detector 21*a* are arranged on the circumference centered on rotation axis line A. The plurality of light receiver groups 21*g* included in increment detector 21*b* are arranged on a circumference centered on rotation axis line A and positioned on the inner diameter side (that is, the side closer to rotation axis line A) with respect to increment detector 21*a*. In other words, increment detector 21*a* is disposed on the outer diameter side with respect to increment detector 21*b*. Increment detector 21*a* is an example of a first increment detector, and increment detector 21*b* is an example of a second increment detector.

Since light receiving element 20 according to the present exemplary embodiment includes two increment detectors 21*a* and 21*b*, redundancy of the increment signal can be ensured. Therefore, it is possible to obtain an increment signal having high resistance to positional deviation and the like.

A detailed configuration of each of the plurality of light receiver groups 21*g* will be described later.

First absolute detector 23 is a detector that outputs a detection signal according to the absolute method. First absolute detector 23 is irradiated with light from light emitter 14 mainly through third pattern portion 53 of rotating plate 40. First absolute detector 23 includes a plurality of first absolute light receivers 23*a*. The plurality of first absolute light receivers 23*a* are arranged on a first circumference having a first radius centered on rotation axis line A. The plurality of light receiver groups 21*g* described above are arranged only on the outer diameter side (that is, the side farther from rotation axis line A with respect to the plurality of first absolute light receivers 23*a*) of the inner diameter side and the outer diameter side with respect to the plurality of first absolute light receivers 23*a*. The plurality of light receiver groups 21*g* are arranged on a second circumference that is concentric with a first circumference of a first radius on which the plurality of first absolute light receivers 23*a* are arranged and has a second radius larger than the first circumference. The plurality of first absolute light receivers 23*a* and the plurality of light receiver groups 21*g* do not overlap.

As described above, since increment detectors 21*a* and 21*b* are disposed on the outer diameter side of first absolute detector 23, it is possible to suppress a decrease in the circumferential dimension of increment detectors 21*a* and 21*b*. As a result, the degree of freedom in designing the plurality of light receiver groups 21*g* included in increment detectors 21*a* and 21*b* can be enhanced. Therefore, distortion of the detection signals from increment detectors 21*a* and 21*b* can be reduced.

In addition, in the present exemplary embodiment, since the two increment detectors 21*a* and 21*b* are arranged close to each other, it is possible to suppress complication of wiring as compared with the case where two increment detectors 21a and 21b are arranged separately.

Second absolute detector 22 is a detector that outputs a detection signal according to the absolute method. Second absolute detector 22 is irradiated with light from light emitter 14 mainly through second pattern portion 52 of rotating plate 40. Second absolute detector 22 includes a plurality of second absolute light receivers 22a. The plurality of second absolute light receivers 22a are arranged on a fourth circumference which is concentric with the first circumference and has a fourth radius larger than the first radius and smaller than the second radius. The plurality of second absolute light receivers 22a do not overlap with the plurality of light receiver groups 21g and the plurality of first absolute light receivers 23a.

Rotation speed detector 24 is a detector that outputs a detection signal corresponding to the rotation speed of rotating plate 40. The rotation speed detector 24 is irradiated with light from light emitter 14 mainly through fourth pattern portion 54 of rotating plate 40. The rotation speed detector 24 includes one or more arcuate light receivers 24a. Arcuate light receiver 24a is concentric with the first circumference (that is, about rotation axis line A), and is disposed on a third circumference having a third radius smaller than the first radius. The width of one or more arcuate light receivers 24a in the direction of the third circumference is larger than the width of each of the plurality of first absolute light receivers 23a in the direction of the first circumference. In the present exemplary embodiment, rotation speed detector 24 includes four arcuate light receivers 24a having different radii. Four arcuate light receivers 24a do not overlap with first absolute light receiver 23a.

Since the rotation speed detector 24 is disposed most on the inner diameter side among the detectors, the dimension in the circumferential direction is limited. However, as described above, the width of arcuate light receiver 24a of rotation speed detector 24 can be made larger than the width of first absolute light receiver 23a, so that the sufficient light can be received to detect the rotation speed.

In the present exemplary embodiment, light emitter 14 is disposed in light receiving element 20. Light emitter 14 is disposed between first absolute detector 23 and second absolute detector 22. As described above, by disposing light emitter 14 near first absolute detector 23 and second absolute detector 22, the intensity of light received by first absolute detector 23 and second absolute detector 22 can be increased. Therefore, the detection accuracy of first absolute detector 23 and second absolute detector 22 can be enhanced.

[1-4. Configuration of Light Receiver Group]

Figure 5:
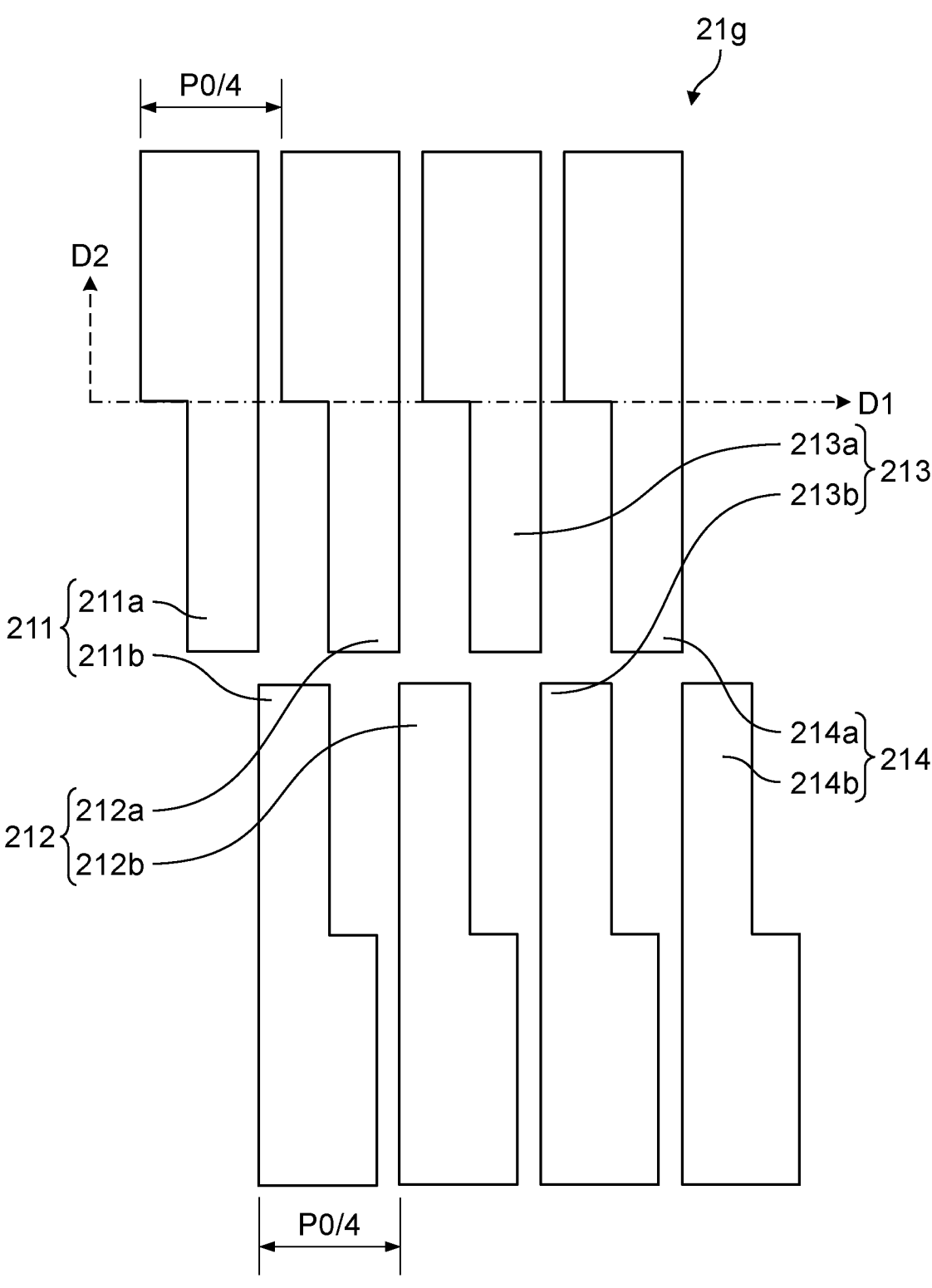
FIG. 5 is a plan view illustrating a configuration of a light receiver group included in the light receiving element according to the exemplary embodiment.

The plurality of light receiver groups 21g of light receiving element 20 will be described with reference to FIG. 5. FIG. 5 is a plan view illustrating a configuration of light receiver group 21g according to the present exemplary embodiment.

As illustrated in FIG. 5, light receiver group 21g includes a first light receiver 211 and second light receiver 212 arranged at a position shifted by ¼ of arrangement pitch P0 in the arrangement direction with respect to first light receiver 211. In the present exemplary embodiment, light receiver group 21g further includes third light receiver 213 and fourth light receiver 214. Third light receiver 213 is shifted in the arrangement direction by ½ of arrangement pitch P0 with respect to first light receiver 211, and is arranged at a position shifted in the arrangement direction by ¼ of arrangement pitch P0 with respect to second light receiver 212. Fourth light receiver 214 is shifted in the arrangement direction by ¾ of arrangement pitch P0 with respect to first light receiver 211, and is arranged at a position shifted in the arrangement direction by ¼ of arrangement pitch P0 with respect to third light receiver 213. Light receiver group 21g is irradiated with light from light emitter 14 mainly through first pattern portion 51 of rotating plate 40. The intensity of the light from light emitter 14 is periodically modulated by first pattern portion 51 as rotating plate 40 rotates. Therefore, the intensity of the light with which light receiver group 21g is irradiated varies periodically. The phases of the intensity modulation of the light applied to second light receiver 212, third light receiver 213, and fourth light receiver 214 are shifted by 90 degrees, 180 degrees, and 270 degrees, respectively, from the phase of the intensity modulation of the light applied to first light receiver 211.

First light receiver 211 is separated into first body 211a and first separation portion 211b in which a width in arrangement direction D1 is less than ¼ of arrangement pitch P0. First body 211a and first separation portion 211b are arranged to be spaced apart from each other in vertical direction D2 perpendicular to arrangement direction D1. In the present exemplary embodiment, arrangement direction D1 is a direction along a circumference centered on rotation axis line A and passing through the plurality of light receiver groups 21g. Vertical direction D2 is a radial direction of a circle centered on rotation axis line A.

Second light receiver 212 is separated into second body 212a and second separation portion 212b in which a width in arrangement direction D1 is less than ¼ of arrangement pitch P0, and second body 212a and second separation portion 212b are arranged to be spaced apart from each other in vertical direction D2.

Third light receiver 213 is separated into third body 213a and third separation portion 213b whose widths in arrangement direction D1 are less than ¼ of arrangement pitch P0, and third body 213a and third separation portion 213b are arranged to be separated from each other in vertical direction D2.

Fourth light receiver 214 is separated into fourth body 214a and fourth separation portion 214b in which a width in arrangement direction D1 is less than ¼ of arrangement pitch P0, and fourth body 214a and fourth separation portion 214b are arranged to be spaced apart from each other in vertical direction D2.

Figure 6:
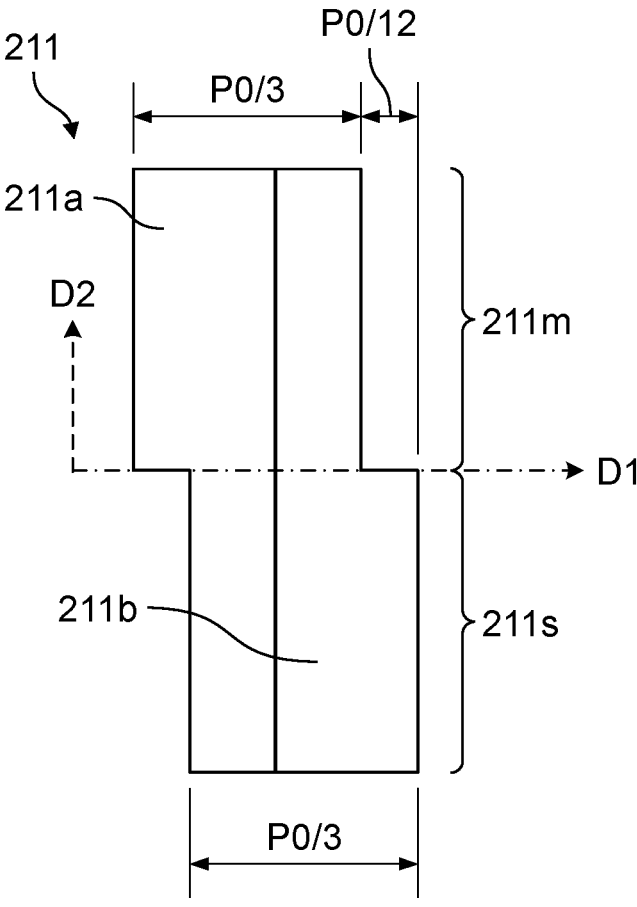
FIG. 6 is a view illustrating a state in which a first body and a first separation portion of a first light receiver included in the light receiving element according to the exemplary embodiment are arranged on the same circumference.

Here, the structure of first light receiver 211 will be described with reference to FIG. 6. FIG. 6 is a view illustrating a state in which first body 211a and first separation portion 211b of first light receiver 211 according to the present exemplary embodiment are arranged on the same circumference.

As illustrated in FIG. 6, in a state where first body 211a and first separation portion 211b of first light receiver 211 are arranged on the same circumference, first light receiver 211 includes first main phase portion 211m and first sub phase portion 211s. First main phase portion 211m has a width of ⅓ of arrangement pitch P0 in arrangement direction D1. First sub phase portion 211s has a width of ⅓ of arrangement pitch P0 in arrangement direction D1. First sub phase portion 211s is arranged at a position shifted in arrangement direction D1 by 1/12 of arrangement P0 with respect to first main phase portion 211m and at a position adjacent to first main phase portion 211m in vertical direction D2.

Since first main phase portion 211m of first light receiver 211 has a width of ⅓ of arrangement pitch P0 in arrangement direction D1, first main phase portion 211*m* outputs a trapezoidal wave-shaped periodic signal as rotating plate 40 rotates. Similarly, first sub phase portion 211*s* also outputs a trapezoidal wave-shaped periodic signal. Since first sub phase portion 211*s* is arranged at the position shifted in arrangement direction D1 by $\frac{1}{12}$ of arrangement pitch P0 with respect to first main phase portion 211*m*, the phase of the signal output from first sub phase portion 211*s* is shifted by 30 degrees (that is, 360 degrees/12) with respect to the signal output from first main phase portion 211*m*. The signal output from first light receiver 211 is the sum of the signal output from first main phase portion 211*m* and the signal output from first sub phase portion 211*s*. Therefore, the waveform of the signal output from first light receiver 211 is a waveform obtained by combining two trapezoidal waves, and is closer to a sine wave than the trapezoidal wave, that is, a waveform with less distortion.

Similarly to first light receiver 211, second light receiver 212 also includes a second main phase portion and a second sub phase portion in a state where second body 212*a* and second separation portion 212*b* are arranged on the same circumference. The second main phase portion has a width of $\frac{1}{3}$ of arrangement pitch P0 in arrangement direction D1. The second sub phase portion has a width of $\frac{1}{3}$ of arrangement pitch P0 in arrangement direction D1. The second sub phase portion is arranged at a position shifted in arrangement direction D1 by $\frac{1}{12}$ of arrangement pitch P0 with respect to the second main phase portion and at a position adjacent to the second main phase portion in vertical direction D2.

Similarly, third light receiver 213 has a third main phase portion and a third sub phase portion. Similarly, fourth light receiver 214 has a fourth main phase portion and a fourth sub phase portion.

As a result, each of the plurality of light receiver groups 21*g* can suppress distortion of the output signal. Therefore, light receiving element 20 can detect the position of rotating plate 40 in the rotation direction with higher accuracy.

When first body 211*a* and first separation portion 211*b* of first light receiver 211 are integrated as illustrated in FIG. 6, in order to arrange first light receiver 211 and second light receiver 212 in arrangement direction D1 so as not to overlap each other, it is necessary to shift the position of second light receiver 212 in arrangement direction D1 to be larger than $\frac{1}{3}$ of arrangement pitch P0 with respect to first light receiver 211. Here, in order to cause second light receiver 212 to output a signal whose phase is shifted by 90 degrees with respect to the signal output from first light receiver 211, it is necessary to shift the position of second light receiver 212 by $\frac{5}{4}$ of arrangement pitch P0 in arrangement direction D1 with respect to first light receiver 211. Therefore, an unnecessary space in which the light receivers are not arranged over a length of $\frac{11}{12}$ of arrangement pitch P0 is generated between first light receiver 211 and second light receiver 212.

In light receiver group 21*g* according to the present exemplary embodiment, as described above, first light receiver 211 is separated into first body 211*a* and first separation portion 211*b* in which the width in arrangement direction D1 is less than $\frac{1}{4}$ of arrangement pitch P0, and first body 211*a* and first separation portion 211*b* are arranged to be spaced apart from each other in vertical direction D2. In addition, second light receiver 212 is separated into second body 212*a* and second separation portion 212*b* in which the width in arrangement direction D1 is less than $\frac{1}{4}$ of arrangement pitch P0, and second body 212*a* and second separation portion 212*b* are arranged to be spaced apart from each other in vertical direction D2. As a result, as shown in FIG. 5, second body 212*a* can be arranged at a position shifted from the position of first body 211*a* by $\frac{1}{4}$ of arrangement pitch P0 in arrangement direction D1. In addition, second separation portion 212*b* can be arranged at a position shifted from the position of first separation portion 211*b* by $\frac{1}{4}$ of arrangement pitch P0 in arrangement direction D1. First body 211*a* and second body 212*a* are arranged in arrangement direction D1, and a gap between first body 211*a* and second body 212*a* is less than $\frac{1}{4}$ of arrangement pitch P0. First separation portion 211*b* and second separation portion 212*b* are arranged in arrangement direction D1, and a gap between first separation portion 211*b* and second separation portion 212*b* is less than $\frac{1}{4}$ of arrangement pitch P0. Therefore, an unnecessary space between first light receiver 211 and second light receiver 212 can be reduced.

In the present exemplary embodiment, as illustrated in FIG. 5, third light receiver 213 and fourth light receiver 214 also have the same configuration as first light receiver 211 and second light receiver 212. Therefore, third light receiver 213 and fourth light receiver 214 also achieve the same effects as those of first light receiver 211 and second light receiver 212.

[1-5. Light Emitter]

Figure 7:
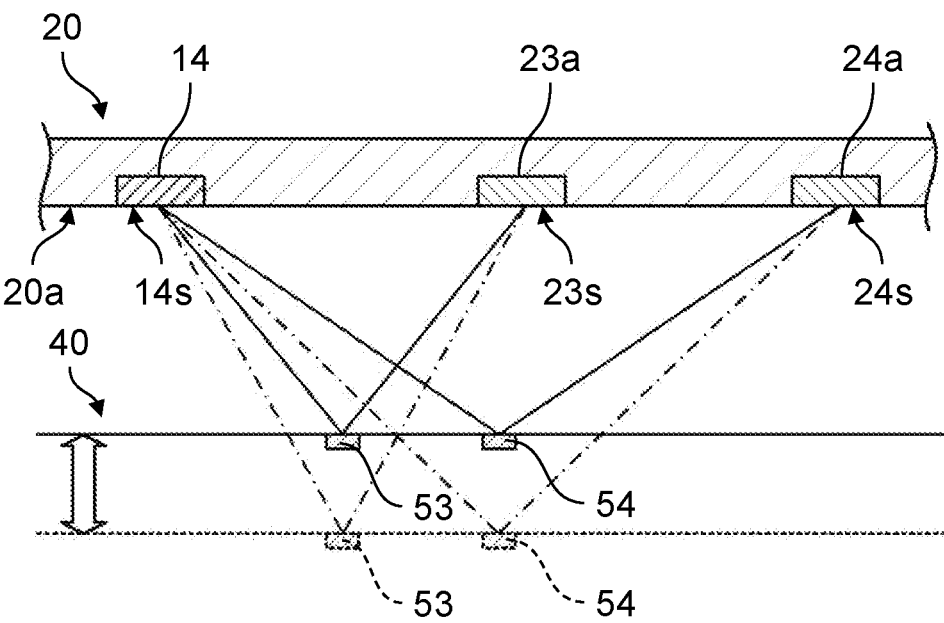
FIG. 7 is a schematic cross-sectional view illustrating a positional relationship between a light emitter of the light receiving element, the light receiving element, and a rotating plate according to the exemplary embodiment.
Figure 8:
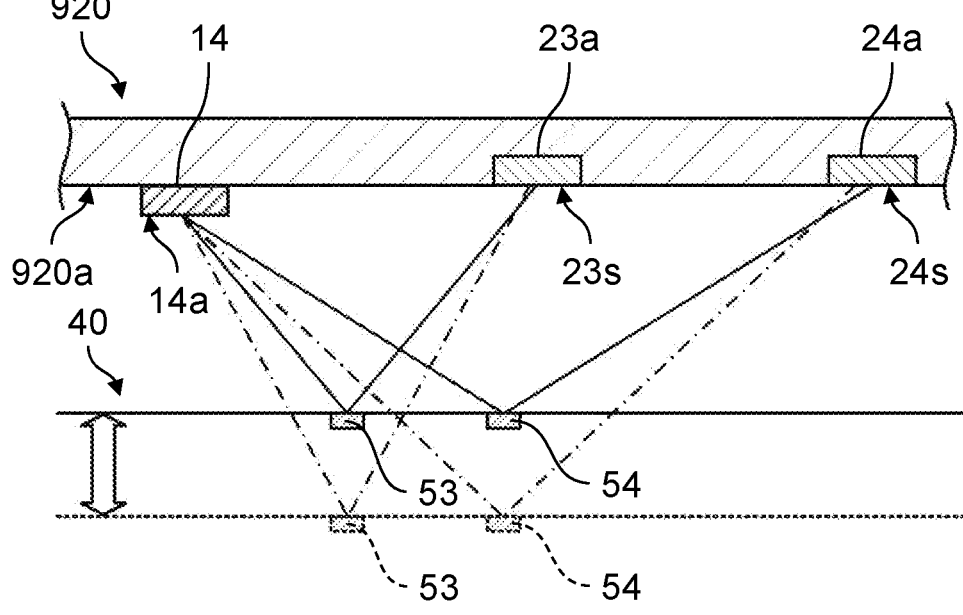
FIG. 8 is a schematic cross-sectional view illustrating a positional relationship between a light emitter of a light receiving element, and the light receiving element and a rotating plate according to a comparative example.

Next, the configuration of light emitter 14 will be described with reference to FIGS. 7 and 8 with comparison with the comparative example. FIG. 7 is a schematic cross-sectional view illustrating a positional relationship between light emitter 14 of light receiving element 20, light receiving element 20, and rotating plate 40 according to the present exemplary embodiment. FIG. 8 is a schematic cross-sectional view illustrating a positional relationship between light emitter 14 of light receiving element 920, and light receiving element 920 and rotating plate 40 according to the comparative example. FIGS. 7 and 8 are cross-sectional views viewed from a direction perpendicular to rotation axis line A.

As illustrated in FIG. 7, light emitter 14 according to the present exemplary embodiment has light emitting surface 14*s* that emits light. Each of the plurality of first absolute light receivers 23*a* has light receiving surface 23*s* that receives light, and light emitting surface 14*s* is disposed on the same plane as light receiving surface 23*s*. Arcuate light receiver 24*a* has light receiving surface 24*s*, and light emitting surface 14*s* is disposed on the same plane as light receiving surface 24*s*. In the present exemplary embodiment, principal surface 20*a* facing rotating plate 40, light emitting surface 14*s*, light receiving surface 23*s*, and light receiving surface 24*s* of light receiving element 20 are disposed on the same plane. In the present exemplary embodiment, the light receiving surfaces of the plurality of second absolute light receivers 22*a* and the plurality of light receiver groups 21*g* are also disposed on the same plane as principal surface 20*a*.

On the other hand, light emitting surface 14*s* of light emitter 14 according to the comparative example is not disposed on the same plane as light receiving surfaces 23*s* and 24*s*. That is, light emitting surface 14*s* is disposed at a position protruding from principal surface 920*a* of light receiving element 920.

In general, in the rotation detector, as illustrated in FIG. 7, the distance between light receiving element 20 and rotating plate 40 may vary. As described above, when the distance between light receiving element 20 and rotating plate 40 varies, in light receiving element 920 according to the comparative example, light emitting surface 14*s* is not arranged on the same plane as light receiving surfaces 23*s* and 24*s*, and thus, as illustrated in FIG. 8, the position where the light from light emitter 14 is incident on each of light receiving surfaces 23*s* and 24*s* varies. Therefore, the phase of the detection signal from each light receiver varies. Therefore, the detection accuracy of the rotation detector decreases.

On the other hand, in light receiving element 20 according to the present exemplary embodiment, since light emitting surface 14*s* is arranged on the same plane as light receiving surfaces 23*s* and 24*s*, as illustrated in FIG. 7, the position where the light from light emitter 14 is incident on each of light receiving surfaces 23*s* and 24*s* does not vary. Therefore, with light receiving element 20 according to the present exemplary embodiment, a highly accurate detection signal can be output even when the distance between light receiving element 20 and rotating plate 40 varies.

Modifications

Although the light receiving element and the rotation detector according to the present disclosure have been described above on the basis of the exemplary embodiments, the present disclosure is not limited to the above exemplary embodiments.

For example, in the above exemplary embodiment, rotating plate 40 includes the pattern that reflects a part of the light from light emitter 14, but the configuration of the pattern is not limited thereto. For example, the pattern portion may be a slit or the like that transmits a part of the light from light emitter 14. In this case, a rotating plate is disposed between light emitter 14 and the light receiver.

The present disclosure also includes embodiments resulting from various changes made to the above-described exemplary embodiments by those skilled in the art, as well as exemplary embodiments made by any combination of constituent elements and functions of the exemplary embodiments without departing from the spirit of the present disclosure.

INDUSTRIAL APPLICABILITY

The technique of the present disclosure can be used for a rotation detector that detects a rotation amount of an electric motor or the like.

REFERENCE MARKS IN THE DRAWINGS 1 electric motor
2 motor frame
3 stator
4 rotor
5 rotary shaft
6 frame
7 bearing
8 boss
9 bolt
10 rotation detector
12 substrate
13 screw
14 light emitter
14*s* light emitting surface
20, 920 light receiving element
20*a*, 920*a* principal surface
21*a*, 21*b* increment detector
21*g* Light receiver group
22 second absolute detector
22*a* second absolute light receiver 23 first absolute detector
23*a* first absolute light receiver
23*s*, 24*s* light receiving surface
24 rotation speed detector
24*a* arcuate light receiver
40 rotating plate
42 body
50 pattern portion
51 first pattern portion
51*a*, 52*a*, 53*a*, 54*a* low reflection region
52 second pattern portion
53 third pattern portion
54 fourth pattern portion
211 first light receiver
211*a* first body
211*b* first separation portion
211*m* first main phase portion
211*s* first sub phase portion
212 second light receiver
212*a* second body
212*b* second separation portion
213 third light receiver
213*a* third body
213*b* third separation portion
214 fourth light receiver
214*a* fourth body
214*b* fourth separation portion

The invention claimed is:

1. A light receiving element comprising:

a plurality of first absolute light receivers that are arranged on a first circumference having a first radius and output a detection signal according to an absolute method; and a plurality of light receiver groups that output a detection signal according to an increment method, wherein:

the plurality of light receiver groups are selectively arranged in a region having a radius greater than the first circumference, and are arranged on a second circumference concentric with the first circumference and having a second radius greater than the first radius, the plurality of first absolute light receivers do not overlap with the plurality of light receiver groups, the plurality of light receiver groups are arranged at a predetermined arrangement pitch in an arrangement direction along the second circumference, each of the plurality of light receiver groups includes a first light receiver and a second light receiver arranged at a position shifted by ¼ of the predetermined arrangement pitch in the arrangement direction with respect to the first light receiver, the first light receiver includes a first main phase portion and a first sub phase portion shifted in the predetermined arrangement direction by ¹⁄₁₂ of the predetermined arrangement pitch with respect to the first main phase portion, the first main phase portion includes a first main body portion and a first main separation portion arranged to be spaced apart from each other in the vertical direction, a width of the first main separation portion in the arrangement direction is less than ¼ of the predetermined arrangement pitch, the first main phase portion, as a whole, has a width of ⅓ of the predetermined arrangement pitch in the arrangement direction, the first sub phase portion includes a first sub body portion and a first sub separation portion arranged to be spaced apart from each other in the vertical direction, a width of the first sub separation portion in the arrangement direction is less than ¼ of the predetermined arrangement pitch, the first sub phase portion, as a whole, has a width of ⅓ of the predetermined arrangement pitch in the arrangement direction, the first sub separation portion is adjacent to the first main body portion, the first main separation portion is adjacent to the first sub body portion, the second light receiver includes a second main phase portion and a second sub phase portion shifted in the arrangement direction by 1/12 of the predetermined arrangement pitch with respect to the second main phase portion, the second main phase portion includes a second main body portion and a second main separation portion arranged to be spaced apart from each other in the vertical direction, a width of the second main separation portion in the arrangement direction is less than ¼ of the predetermined arrangement pitch, the second main phase portion, as a whole, has a width of ⅓ of the predetermined arrangement pitch in the arrangement direction, the second sub phase portion includes a second sub body portion and a second sub separation portion arranged to be spaced apart from each other in the vertical direction, a width of the second sub separation portion in the arrangement direction is less than ¼ of the predetermined arrangement pitch, the second sub phase portion, as a whole, has a width of ⅓ of the predetermined arrangement pitch in the arrangement direction, the second sub separation portion is adjacent to the second main body portion, the second main separation portion is adjacent to the second sub body portion, the first main body portion and the second main body portion are arranged in the arrangement direction, and a gap between the first main body portion and the second main body portion is less than ¼ of the predetermined arrangement pitch, and the first main separation portion and the second main separation portion are arranged in the arrangement direction, and a gap between the first main separation portion and the second main separation portion is less than ¼ of the predetermined arrangement pitch.

2. The light receiving element according to claim 1, further comprising an arcuate light receiver that is concentric with the first circumference and is arranged on a third circumference having a third radius smaller than the first radius, wherein a width of the arcuate light receiver in a direction of the third circumference is greater than a width of each of the plurality of first absolute light receivers in a direction of the first circumference, and the plurality of first absolute light receivers do not overlap with the arcuate light receiver.

3. The light receiving element according to claim 1, further comprising a plurality of second absolute light receivers that are arranged on a fourth circumference concentric with the first circumference and having a fourth radius greater than the first radius and smaller than the second radius, and outputs a detection signal according to the absolute method, wherein the plurality of first absolute light receivers do not overlap with the plurality of second absolute light receivers.

4. The light receiving element according to claim 3, further comprising a light emitter that is disposed between the plurality of first absolute light receivers and the plurality of second absolute light receivers and emits light.

5. The light receiving element according to claim 1, further comprising a light emitter that emits light.

6. The light receiving element according to claim 5, wherein the light emitter has a light emitting surface that emits the light, each of the plurality of first absolute light receivers includes a light receiving surface that receives the light, and the light emitting surface is disposed on a same plane as the light receiving surface.

7. A rotation detector comprising:

the light receiving element according to claim 5; and a rotating plate that is irradiated with the light and rotates about a rotary shaft, wherein the light is emitted to the light receiving element via the rotating plate.

* * * * *